(12) United States Patent
Maker et al.

(10) Patent No.: US 8,236,735 B2
(45) Date of Patent: *Aug. 7, 2012

(54) OLIGOGLYCEROL FATTY ACID ESTER LUBRICANT ADDITIVES FOR DRILLING FLUIDS

(75) Inventors: Diana Maker, Monheim (DE); Heinz Muller, Monheim (DE)

(73) Assignee: Emery Oleochemicals GmbH, Dusseldorf (DE)

( * ) Notice: Subject to any disclaimer, the term of this patent is extended or adjusted under 35 U.S.C. 154(b) by 14 days.

This patent is subject to a terminal disclaimer.

(21) Appl. No.: 12/677,845

(22) PCT Filed: Sep. 12, 2008

(86) PCT No.: PCT/EP2008/062199
§ 371 (c)(1),
(2), (4) Date: Jul. 8, 2010

(87) PCT Pub. No.: WO2009/037211
PCT Pub. Date: Mar. 26, 2009

(65) Prior Publication Data
US 2010/0298176 A1 Nov. 25, 2010

(30) Foreign Application Priority Data
Sep. 14, 2007 (EP) .................................. 07018087

(51) Int. Cl.
*C08K 5/20* (2006.01)
*C09K 8/36* (2006.01)
(52) U.S. Cl. .......... 507/138; 507/136; 507/904; 516/53; 516/72; 516/73; 554/227
(58) Field of Classification Search ................... 507/138, 507/136, 904; 516/53, 72, 73; 554/227
See application file for complete search history.

(56) References Cited

U.S. PATENT DOCUMENTS

| | | | |
|---|---|---|---|
| 4,374,737 A | 2/1983 | Larson et al. | |
| 4,614,604 A | 9/1986 | Helfert et al. | |
| 4,802,998 A | 2/1989 | Mueller et al. | |
| 5,232,910 A | 8/1993 | Mueller et al. | |
| 5,252,554 A | 10/1993 | Mueller et al. | |
| 5,254,531 A | 10/1993 | Mueller et al. | |
| 5,318,954 A | 6/1994 | Mueller et al. | |
| 5,318,956 A | 6/1994 | Mueller et al. | |
| 5,348,938 A | 9/1994 | Mueller et al. | |
| 5,403,822 A | 4/1995 | Mueller et al. | |
| 5,441,927 A | 8/1995 | Mueller et al. | |
| 5,461,028 A | 10/1995 | Mueller et al. | |
| 5,663,122 A | 9/1997 | Mueller et al. | |
| 5,755,892 A | 5/1998 | Herold et al. | |
| 5,846,601 A | 12/1998 | Ritter et al. | |
| RE36,066 E | 1/1999 | Mueller et al. | |
| 5,869,434 A | 2/1999 | Mueller et al. | |
| 6,022,833 A | 2/2000 | Mueller et al. | |
| 6,122,860 A | 9/2000 | Von Tapavicza et al. | |
| 6,165,946 A | 12/2000 | Mueller et al. | |
| 6,289,989 B1 | 9/2001 | Mueller et al. | |
| 6,350,788 B1 | 2/2002 | Herold et al. | |
| 6,716,799 B1 | 4/2004 | Mueller et al. | |
| 6,806,235 B1 | 10/2004 | Mueller et al. | |
| 6,828,279 B2 | 12/2004 | Patel et al. | |
| 7,041,738 B2 | 5/2006 | Krull et al. | |
| 7,666,820 B2 | 2/2010 | Mueller et al. | |
| 7,741,248 B2 | 6/2010 | Mueller et al. | |
| 2003/0114316 A1 | 6/2003 | Patel et al. | |
| 2004/0006912 A1 | 1/2004 | Krull | |
| 2004/0010965 A1 | 1/2004 | Krull | |
| 2005/0000734 A1* | 1/2005 | Getzlaf et al. | 175/73 |
| 2006/0162241 A1 | 7/2006 | Krull | |
| 2007/0219097 A1 | 9/2007 | Mueller et al. | |
| 2007/0219098 A1 | 9/2007 | Mueller et al. | |
| 2008/0234145 A1 | 9/2008 | Mueller et al. | |
| 2008/0262252 A1 | 10/2008 | Krull | |
| 2010/0256021 A1* | 10/2010 | Muller et al. | 507/138 |

FOREIGN PATENT DOCUMENTS

| | | |
|---|---|---|
| CA | 2101757 A1 | 8/1992 |
| DE | 3622826 A1 | 1/1988 |
| DE | 4018228 A1 | 12/1991 |
| DE | 4102908 A1 | 8/1992 |
| DE | 19614722 A1 | 10/1997 |
| DE | 10252973 A1 | 5/2004 |
| EP | 0064697 A1 | 11/1982 |
| EP | 0374671 A1 | 6/1990 |
| EP | 0374672 A1 | 6/1990 |
| EP | 0765368 A1 | 4/1997 |
| WO | 9534610 A1 | 12/1995 |
| WO | 03014253 A1 | 2/2003 |

OTHER PUBLICATIONS

Daute et al., U.S. Appl. No. 12/743,878, filed May 20, 2010.
International Preliminary Report on Patentability mailed on Apr. 7, 2010 in PCT/EP2008/062199.
International Search Report mailed on Nov. 6, 2008 in PCT/EP2008/062199.
Muller et al., U.S. Appl. No. 12/677,896, filed Mar. 12, 2010.
Muller et al., U.S. Appl. No. 12/738,701, filed Jun. 11, 2010.
Westfechtel et al., U.S. Appl. No. 12/677,874, filed Mar. 12, 2010.

* cited by examiner

*Primary Examiner* — Timothy J. Kugel
(74) *Attorney, Agent, or Firm* — Smith Moore Leatherwood LLP; Philip P. McCann (57) ABSTRACT

The use is described of oligoglycerol fatty acid esters, produced from
(a) an acid component, selected from
  (a1) fatty acids of the general formula (I)

R—COOH                                        (I)

in which R stands for a saturated or unsaturated, branched or linear alkyl- or alkenyl radical with 7 to 21C atoms, and/or
  (a2) dicarboxylic acids and/or
  (a3) dimer fatty acids and/or
  (a4) oligomer fatty acids and/or
  (a5) hydroxy fatty acids with
(b) a polyol component, which is selected from oligoglycerols or alkoxylates of oligoglycerols, as additive to oil-based drilling mud compositions to improve the lubricating effect of these mud systems.

15 Claims, 3 Drawing Sheets

OLIGOGLYCEROL FATTY ACID ESTER LUBRICANT ADDITIVES FOR DRILLING FLUIDS

The present application relates to the use of particular esters as additive in oil-base drilling mud compositions, and to drilling mud compositions which contain these additives. The additives according to the invention serve here in particular to improve the lubricating effect of the drilling muds.

Borehole treatment agents are all types of auxiliary liquids which can be used in the exploratory drilling of petroleum or natural gas fields. Special importance is attached here to the so-called drilling mud compositions and drilling slurries or drilling muds built up thereon, which can be used both in land-based and also in sea-based boreholes. On the one hand, water-based drilling muds are known, with a content of approximately 1 to 50% of emulsified oil phase—in addition to the other conventional adjuvants of such a drilling mud—which are also designated as O/W emulsion muds. On the other hand, oil-based mud systems in which the oil forms the flowable phase or at least forms a substantial proportion of the flowable phase as continuous oil phase are widely used in practice. The so-called invert drilling slurries which on the basis of W/O emulsions contain a disperse aqueous phase in the closed oil phase are particularly important here. The content of disperse aqueous phase usually lies in the range from at least approximately 5 to 10% by weight to approximately 50 to 60% by weight. In addition to these W/O invert drilling slurries, however, the so-called true oil muds are also known, the liquid phase of which is formed almost exclusively from a continuous oil phase, and which at most contain small quantities—usually no more than approximately 5 to 10% by weight—of aqueous phase in dispersed form. The non-aqueous phase of such mud systems is formed by the so-called carrier fluid. This was originally diesel oil which, mixed with particular additives, forms the actual drilling mud. At the end of the 1980s, however, the need arose for environmentally friendly mud systems and therefore carrier fluids. These were, in particular, to have better biodegradability than the diesel oil which was used hitherto.

In addition to various liquid esters, such as are described e.g. in EP 0 374 672 A1, olefinic hydrocarbons were also investigated for their usability. Reference is made here, by way of example, to EP 0 765 368 A1, the subject of which is the use of so-called alpha olefins as carrier fluid.

One of the persistent problems in the formulation of such oil-based drilling mud compositions is an inadequate lubricating effect of the composition which, however, can be improved by the addition of additives. This problem occurs in particular in muds of which the oil phase contains short-chain and branched paraffins, but also in oil phases containing linear alpha olefins or internal olefins e.g. with the C chain length $C_{14}$ to $C_{18}$. In the diverted boreholes, which in the meantime have become usual in the off-shore field, there is also a requirement for an increased lubricating effect with oil-based mud systems.

It was now found that through the use of particular polyol esters, an improvement can be brought about in the lubricating effect of oil-based drilling muds.

The object of the invention is the use of oligoglycerol fatty acid esters, produced from
(a) an acid component, selected from
(a1) fatty acids of the general formula (I) R—COOH (I) in which R stands for a saturated or unsaturated, branched or linear alkyl- or alkenyl radical with 7 to 21 C atoms, and/or (a2) dicarboxylic acids, (a3) dimer fatty acids and/or (a4) oligomer fatty acids and/or
(a5) hydroxy fatty acids with
(b) a polyol component, which is selected from oligoglycerols or alkoxylates of oligoglycerols, as lubricant additive in oil-based drilling mud compositions.

The oligoglycerol esters according to the invention are compounds known per se, which can be obtained e.g. by acid or base catalyzed esterification directly from oligoglycerol with the fatty acids. EP 064 697 A1 describes various oligoglycerol esters as lubricant for PVC. In this publication, the production of oligoglycerol esters by means of basic catalysis from fatty acids and poly- or oligoglycerols is also described. The oligoglycerol esters (or "oligoglycerides" for short) in the sense of the invention are generally compounds which are liquid at room temperature and consist of a mixture of various oligoglycerol esters, wherein starting materials, in particular glycerol, can also be contained. Typically, technical-grade oligoglycerols which can be used for the production of the oligoglycerol esters according to the invention contain mixtures of di- and triglycerol and tetra- and pentaglycerols and glycerol. Depending on the quality of the oligoglycerols, these can contain between 20 and 45% by weight of glycerol, between 20 and 40% by weight of diglycerol, between 10 and 20% by weight of triglycerol and between 1 to 10% by weight of tetraglycerol and between 0.5 to 5% by weight of pentaglycerol.

From DE 102 52 973 A1 it is already known to use oligoglycerol fatty acid esters together with a selected alkyl phenol resin to improve the lubricating power of fuel oils. US 2003/0114316 A1 discloses invert drilling mud systems, i.e. compositions which contain a water- and oil phase in the form side by side in emulsified form, and exclusively as a water-in-oil emulsion, wherein the oil phase is continuous and the water phase constitutes the discontinuous phase, wherein these invert systems must contain either fatty acid esters of di- or triglycerol or esters of polyglycerols, respectively with fatty acids of the $C_{10}$-$C_{20}$ fraction as emulsifiers. The esters of this publication are obligatorily diesters of these $C_{10}$-$C_{20}$ fatty acids with di- or triglycerol or polyglycerols, wherein only the polyglycerol-2-diisostearate and polyglycerol-3-diisostearate are disclosed by name. These esters serve in accordance with the teaching of US 2003/0114316 as emulsifiers, in order to produce the desired invert emulsion. A suitability as lubricant cannot be seen from this publication.

The fatty acids of type (a1), which follow formula (I), in particular come into consideration as acid component (a) of the esters according to the invention. Named as being preferred here are caproic acid, caprylic acid, 2-ethylhexanoic acid, capric acid, lauric acid, isotridecanoic acid, myristic acid, palmitic acid, palmoleic acid, stearic acid, isostearic acid, oleic acid, elaidic acid, petroselic acid, linoleic acid, linolenic acid, elaeostearic acid, arachic acid, gadoleic acid, behenic acid and erucic acid and mixtures thereof, which occur e.g. for technical reasons during high-pressure cracking of natural fats and oils, or during reduction of aldehydes from Roelen's oxosynthesis. Technical-grade fatty acids with 12 to 18 carbon atoms are preferred, such as for example coconut-, palm-, palm kernel- or tallow fatty acid.

Particularly preferred are oligoglycerol esters, wherein the fatty acid component (a1) is selected from mono- or polyunsaturated, preferably linear fatty acids and preferably the linear unsaturated monocarboxylic acids, wherein the oleic acid, also in technical-grade qualities, is particularly preferred.

Likewise preferred are oligoglycerol esters, the component (a1) of which is selected from tall oil fatty acids. Tall oil fatty acids contain in particular mixtures of linoleic acid and conjugated $C_{18}$ fatty acids (45-65% by weight), oleic acid (25-

45% by weight), octadeca-5,9,12-trienic acid (5-12% by weight) and saturated fatty acids (1-3% by weight). In addition to the monocarboxylic acids of the type (a1), dicarboxylic acids (a2), dimer fatty acids or oligomer fatty acids of the type (a3) or (a4) are also suitable.

The dicarboxylic acids (a2) likewise constitute suitable acid components. These are the carboxylic acids which contain two —COOH functions in the molecule, wherein in particular the saturated dicarboxylic acids are preferred. The dicarboxylic acids (a2) preferably contain between 4 and 22 C atoms, in particular between 6 and 18 C atoms. Oxalic, malonic, succinic, glutaric, adipic, pimelic, suberic, azealaic or sebacic acids are named by way of example. Unsaturated dicarboxylic acids are also possible, e.g. fumaric or maleic acids. The dicarboxylic acids of group (a2) do not comprise the dimer fatty acids of group (a3).

Dimer fatty acids (a3), on the other hand, are oxidation-stabilized dicarboxylic acids which are liquid at room temperature (21° C.), which are obtained e.g. by catalytic dimerization of unsaturated fatty acids, e.g. of oleic acid, ricinine fatty acid or tall oil fatty acid under oxygen exclusion. Depending on the fatty acid which is used, the linking produces linear, monocyclic or aromatic structures. The reaction runs under isomerization of isolated double bonds predominantly after an addition of the Diels-Alder type. Commercially available dimerized fatty acids are worked up distillatively and consist of a mixture which contains e.g. in addition to small proportions of linear and branched $C_{18}$-monocarboxylic acids (monomer fatty acid), predominantly $C_{36}$-dicarboxylic acids and depending on the effort of working up, differently high proportions of $C_{54}$-tricarboxylic acid (trimer fatty acid) in addition to traces of higher polymer fatty acids. Both high-purity dimeric fatty acids containing >97% by weight of dicarboxylic acid and also hydrogenated, fully yellowing-free types are produced industrially.

Oligomeric fatty acids (a4) constitute reaction products of unsaturated fatty acids with each other, wherein more than 2 and a maximum of 5 fatty acid molecules must react with each other. This acid component likewise constitutes a mixture of different oligomers with each other.

Mixtures of oligoglycerol esters which have been produced in the presence of various fatty acid sources, or were obtained by mixing, are preferred as polyolcomponents for the esterification. Preferred inter alia are also those oligoglycerol esters which have been produced by reaction of oligoglycerols of formula (II) with fatty acid mixtures, preferably mixtures of saturated and unsaturated fatty acids (type (a1)) and/or dicarboxylic acids (a2), dimeric- and/or oligomeric fatty acids (type (a3) and (a4)).

In addition, hydroxy fatty acids can be used as component (a5), wherein e.g. ricinoleic acid and particularly preferably hydroxystearic acid are representatives of this class of fatty acids.

The component (b), i.e. the oligoglycerols, in the sense of the present teaching, contain between 2 and 10 glycerol monomers in the molecule, wherein depending on the production process (e.g. the reaction temperature or reaction time or the catalysts which are used), mixtures of different oligomers are present alongside each other. Molecules with more than 10 monomers of glycerol are designated as polyglycerols.

The polyol component (b) of the esters according to the invention, i.e. the oligoglycerols, can preferably be described with the following general formula (II):

(II)

wherein n denotes a number between 2 and 10. Preferably, those oligoglycerols which predominantly contain between 2 and 8 and preferably between 4 and 8 glycerol monomers can be used as polyol component (b). The esters then preferably follow the general formula (III):

(III)

in which n stands for numbers between 2 and 10 and R represents either a hydrogen atom or a radical CO—R', wherein R' then represents a saturated or unsaturated alkyl- or alkenyl radical with 7 to 21 C atoms, wherein at least one OH function of the oligoglycerol must be esterified. Depending on the quality of the oligoglycerols, these can contain between 20 and 45% by weight of glycerol, between 20 and 40% by weight of diglycerol, between 10 and 20% by weight of triglycerol and between 1 to 10% by weight of tetraglycerol and between 0.5 to 5% by weight of pentaglycerol.

The formula (III) shown above shows oligoglycerol esters with the acid component (a1). When hydroxy fatty acids (a4) are used for esterification, the radicals R can of course also contain alkyl- or alkenyl radicals which have one or more free hydroxyl functions.

In addition to the oligoglycerols, it is also possible to use their alkoxylates, i.e. reaction products of olilgoglycerols with ethylene oxide and/or oligomers of alkoxylated glycerol with ethylene oxide and/or propylene oxide as alcohol component for the esters according to the invention. The ethoxylated oligoglycerols are preferred here.

It is preferred if in the esterification, the molar ratio of fatty acids:oligoglycerol lies in the range of 5:1 to 1:1, preferably 4:1 to 1:1 and in particular in the range of 4:1 to 1.5:1. However, when dimer fatty acids (a2) or the oligomeric fatty acids (a3) are used as fatty acid component, the range of fatty acid to oligoglycerol of 1:1 to 1:2 is particularly preferred.

Furthermore, in a preferred embodiment, for the production of the oligoglycerol fatty acid esters, in the esterification the molar ratio of the number of carboxyl groups of the acid component to the number of hydroxy groups of the polyol component lies in a range of 5:1 to 1:1, preferably 4:1 to 1:1 and in particular in the range of 4:1 to 1.5:1. When dimer fatty acids (a2) or the oligomeric fatty acid (a3) are selected as acid component, a molar ratio for the number of carboxyl groups of the acid component to the number of hydroxy groups of the polyol component in a range of 1:1 to 1:2 is particularly preferred. When mixtures of several acid components are used, the number of carboxyl groups is the sum of the carboxyl groups of all the acid components. When mixtures of several polyol components are used, the number of hydroxy groups is the sum of the hydroxy groups of all the polyol components. Depending on the reaction conditions for the esterification, full esters or mixtures of the different partial esters can be present alongside each other, optionally in a mixture with full esters. The oligoglycerol esters in the sense of the present technical teaching constitute predominantly partial esters, wherein oligoglycerol triesters and/or tetra- and/or pentaesters are preferred.

The oligoglycerol esters of the invention are used in oil-based drilling muds as an additive, in particular for lubrication. Here, the effect of the oligoglycerol esters according to the invention as lubricant is preferred. A use as lubricant, in particular for lubricating, is defined here as being when the friction of the mud, e.g. with the drill rods and/or the formation is measurably reduced by the addition of the composition.

A further object of the invention therefore relates to the use of the oligoglycerol fatty acid esters according to the invention as lubricant for oil-based drilling mud compositions, preferably for lubrication. In the following, oil-based drilling muds (OBM=oil based mud) are understood to mean those systems which contain at least more than 50% by weight of an oil phase—in relation to the phase of the composition which is liquid at room temperature (21° C.), preferably more than 70% by weight and in particular more than 80% by weight and here particularly preferably more than 90% by weight of an oil, which is not soluble with water, as liquid phase.

The present teaching preferably comprises the use of the oligoglycerides as lubricant additive in muds which form emulsions, either water-in-oil (W/O) or oil-in-water (O/W), wherein the W/O systems, which are also designated as invert muds, are particularly preferred.

Oil-based mud systems are generally those in which the oil forms the flowable phase or at least a substantial proportion of the flowable phase as continuous oil phase. The so-called invert drilling slurries which contain on the basis of W/O emulsions a disperse aqueous phase in the closed oil phase are particularly important here. The content of disperse aqueous phase usually lies in the range from at least approximately 5 to 10% by weight to approximately 50 to 60% by weight. In addition to these W/O invert drilling slurries, however, the so-called true-oil muds are also known, the liquid phase of which is formed almost exclusively from a continuous oil phase, and which, at most contain small quantities—usually no more than approximately 5 to 10% by weight—of aqueous phase in dispersed form.

The oligoglycerol esters according to the above description can either be used alone or in a mixture with further, preferably oil-soluble components in drilling mud compositions as lubricant additive, in particular for lubrication, wherein the friction of the mud, e.g. with the drill rods and/or the formation—is measurably reduced through the addition of the composition. Hydrocarbons, fatty acid esters, fatty acids, fatty alcohols, surfactants, glycerol, triglycerides or glycols or any desired mixtures of these compounds are suitable and preferred here.

Surfactants are likewise suitable admixture components for the oligoglycerol esters. Here, basically all types of surfactants can be used, whether they are anionic, non-ionic, zwitterionic or cationic surfactants. However, the non-ionic and the anionic surfactants are preferred. Typical examples of anionic surfactants are soaps, alkyl benzene sulphonates, alkane sulphonates, olefin sulphonates, alkyl ether sulphonates, glycerol ether sulphonates, methyl ester sulphonates, sulpho-fatty acids, alkyl sulphates, fatty alcohol ether sulphates, glycerol ether sulphates, fatty acid ether sulphates, hydroxy mixed ether sulphates, monoglyceride (ether) sulphates, fatty acid amide(ether) sulphates, mono- and dialkyl sulphosuccinates, mono- and dialkyl sulphosuccinamates, sulphotriglycerides, amide soaps, ether carboxylic acids and salts thereof. The latter are particularly preferred surfactants components in the sense of the present technical teaching. Typical examples of non-ionic surfactants are fatty alcohol polyglycol ethers, alkylphenol polyglycol ethers, fatty acid polyglycol esters, fatty acid amide polyglycol ethers, fatty amine polyglycol ethers, alkoxylated triglycerides, mixed ethers or mixed formulas, optionally partially oxidized alk(en)yl oligoglycosides or glucoronic acid derivatives, fatty acid-N-alkyl glucamides, polyol fatty acid esters, sugar esters, sorbitan esters, polysorbates and amine oxides. When the non-ionic surfactants contain polyglycol ether chains, these can have a conventional, but preferably a restricted homolog distribution. The surfactants are an optional component in the additives. They are preferably used in quantities of 1 to 15% by weight, in particular of 2 to 15 and preferably of 3 to 9% by weight, respectively in relation to the product mixture.

When the oligoglycerol esters are used together with other components as additive, the oligoglycerol esters and the other components are preferably used together in weight ratios of 10:1 to 1:1, preferably of 8:1 to 6:1 and in particular of 5:1 to 1:1.

The additives (if applicable therefore only the oligoglycerol ester or mixtures of different oligoglycerol esters) are used in the sense of the invention preferably in quantities of 10 to 0.1% by weight in relation to the total weight of the mud. Advantageous ranges are 5 to 1% by weight and in particular 3 to 1.5% by weight. The present technical teaching therefore also includes a method for improving the lubricating effect of oil-base drilling muds, preferably for the lubricating of drilling muds, wherein oligoglycerides are added to the muds in quantities of 0.1 to 10% by weight.

A further object of the present invention relates to borehole treatment compositions containing a non-aqueous oil phase, weighting agents, fluid-loss additives, salts and, if applicable, an aqueous phase, emulsifiers, viscosity-regulating additives, wetting agents, biocides, corrosion inhibitors, and/or an alkali reserve, wherein the non-aqueous phase is selected in whole or in part from the group of a) paraffins with 5 to 22 C atoms and/or
b) internal olefins with 12 to 30 C atoms in the molecule and/or
c) carboxylic acid esters of the general formula R—COO—R', in which R stands for a linear or branched, saturated or unsaturated alkyl radical with 15 to 25 C atoms and R' denotes a saturated, linear or branched alkyl radical with 3 to 22 C atoms
d) mineral oils
e) linear alpha olefins (LAOS) with 12 to 30 C atoms
f) carbonates wherein the borehole treatment composition contains additives which contain oligoglycerol esters according to the above description or consist of these in quantities of 0.1 to 10% by weight, preferably in quantities of 1 to 5% by weight and in particular in quantities of 1 to 4% by weight in relation to the weight of the total mud.

Those drilling muds, the density of the liquid component of which is 1.2 to 3.0 g/cm$^3$ and in particular 1.5 to 3.0 g/cm$^3$, can be preferred here. The oil phases of the systems according to the invention contain the components a) to e) alone or the components a), b), d) or e) together in a mixture with esters c and optionally in a mixture with other suitable oil phases. Any desired mixtures of the oil phases a) to e) with each other are also possible.

A further object of the present invention relates to the use of the above oligoglycerol fatty acid esters as lubricant, preferably in the borehole treatment compositions described above. With this use, it is preferred that the friction of the mud, e.g. with the drill rods and/or the formation—is measurably reduced by addition of the agent compared with that of the mud without the oligoglycerol fatty acid ester according to the invention. This frequently involves a reduction to the viscosity of the mud by the addition of the oligoglycerol fatty acid ester according to the invention.

Component a)

Linear or branched paraffins with 5 to 22 C atoms are used according to the invention as component a). Paraffins—more correctly designated as alkanes—are, as is known, saturated hydrocarbons which for the linear or branched representatives follow the general total formula $C_nH_{2n+1}$. The cyclic alkanes follow the general total formula $C_nH_{2n}$. The linear and branched paraffins are particularly preferred, whereas cyclic paraffins are less preferred. The use of branched paraffins is particularly preferred. Furthermore, those paraffins which are liquid at room temperature, i.e. those with 5 to 16 C atoms per molecule, are preferred. However, it can also be preferred to use paraffins with 17 to 22 C atoms, which have a wax-like consistency. However, it is preferred to use mixtures of the different paraffins, wherein it is particularly preferred if these mixtures are still liquid at 21° C. Such mixtures can be formed e.g. from paraffins with 10 to 21 C atoms. Paraffins are particularly preferred oil phases—alone or as mixture component with further oil phases—in drilling muds—preferably those of the invert type, in which the oligoglycerol esters according to the invention are used as thickeners.

Component b)

Internal olefins (hereinafter abbreviated to IOs) can be used according to the invention as component b). IOs are likewise compounds, known per se, which can be produced by all the methods known to the specialist in the art for this. EP 0 787 706 A1 describes e.g. a method for the synthesis of IOs by isomerization of alpha olefins on sulphonic or persulphonic acids. It is characteristic that the IOs which are thus obtained are linear and contain at least one olefinic double bond, which is not situated in the alpha position of the alkyl chain. Preferably, according to the invention those IOs or 10 mixtures are used which contain IOs with 12 to 30 C atoms in the molecule, preferably with 14 to 24 C atoms and in particular with up to 20 C atoms in the molecule.

Component c)

Furthermore, esters of the general formula R—COO—R', in which R stands for a linear or branched, saturated or unsaturated alkyl radical with 15 to 25 C atoms and R' denotes a saturated, linear or branched alkyl radical with 6 to 22 C atoms, are a component of the oil phases according to the invention. Also, such esters are known chemical compounds. Their basic use in drilling muds is e.g. the object of EP 0 374 672 A1 or EP 0 374 671 A1. Particularly preferred is the use of such esters, the radical R of which stands for a saturated or unsaturated alkyl radical with 15 to 25 and R' for a saturated alkyl radical with 3 to 10 C atoms. The saturated compounds are particularly preferred here. It is preferred within the scope of the inventive teaching that the oil phase, alongside the esters according to the above description, contains a maximum of 15% by weight (in relation to the oil phase) of other esters with radicals R, which stand for alkyl radicals with more than 23 C atoms.

Component d)

Mineral oils are a collective name for the liquid distillation products obtained from mineral raw materials (petroleum, brown coal and black coal, wood or peat), which consist substantially of mixtures of saturated hydrocarbons. Preferably, the mineral oils contain only tiny quantities of aromatic hydrocarbons, preferably less than 3% by weight. Mineral oils based on petroleum which are liquid at 21° C. are preferred. The mineral oils preferably have boiling points of 180 to 300° C.

Component e)

Linear alpha olefins (abbreviated to LAO) are unbranched hydrocarbons which are unsaturated in position 1 ("alpha C atom"). They can be based on natural substances, but are also in particular widely obtained synthetically. LAOs based on natural substances are obtained as linear products with an even carbon number by dehydration of fatty alcohols based on natural substances. The LAOs obtained synthetically—produced by oligomerization of ethylene—frequently contain even carbon numbers in the chain, but today methods are also known for the production of uneven-numbered alpha olefins. In the sense of the definition according to the invention—owing to their volatililty—they generally have at least 10, preferably at last 12 to 14 C atoms in the molecule. The upper limit of the LAOs which are flowable at room temperature lies in the range of C18-20. This upper limit is, however, not restrictive for the usability of this substance class in the context of the invention. The upper limit of suitable LAO compounds for the use in the context of the teaching according to the invention therefore lies distinctly above the previously mentioned limit value of C18-20 and can reach for example C30.

Component f)

In the context of the present application, carbonates are understood to mean carbonic acid esters of fatty alcohols with 8 to 22 C atoms, preferably the diesters of carbonic acid. Such compounds and their use as oil phase for drilling mud compositions are described in DE 4018228 A1.

In addition to the components a) to f), other, water-insoluble components can also be contained in the oil phases, provided these are ecologically compatible. Further particularly suitable mixture components of the oil phases according to the invention are therefore, in detail:

(i) esters of $C_{1-5}$ monocarboxylic acids and 1- and/or multifunctional alcohols, wherein radicals of 1-hydric alcohols have at least 6, preferably at least 8 C atoms and the polyhydric alcohols preferably have 2 to 6 C atoms in the molecule, (ii) mixtures of secondary esters, selected from the group of propyl carboxylate, butyl carboxylate, pentyl carboxylate, hexyl carboxylate, heptyl carboxylate, octyl carboxylate, nonyl carboxylate, decyl carboxylate, undecyl carboxylate, dodecyl carboxylate, tridecyl carboxylate, tetradecyl carboxylate, pentadecyl carboxylate, hexadecyl carboxylate, heptadecyl carboxylate, octadecyl carboxylate, nonadecyl carboxylate, eicosyl carboxylate, uneicosyl carboxylate, doeicosyl carboxylate and isomers thereof, wherein the secondary esters respectively have a carboxylate radical with 1 to 5 C atoms, water-insoluble ethers of monohydric alcohols having 6 to 24 C atoms, (iii) water-insoluble alcohols with 8 to 36 C atoms (iv) poly-alpha olefins (PAO)

(v) mixtures of the components (i) to (iv)

The drilling muds according to the invention, when they are those of the emulsion type, contain emulsifiers as a further component.

The decisive factor in the choice thereof is the type of mud. Emulsifiers which are usable in practice for the formation of W/O emulsions are in particular selected oleophilic fatty acid salts, for example those based on amidoamine compounds. Examples of these are described in U.S. Pat. No. 4,374,737 and the literature cited therein. The emulsifiers for the formation of the drilling mud can be identical to or different from those which are used in the additives themselves in accordance with the invention.

As emulsifiers, preferably non-ionic emulsifiers come into consideration, which are allocated in particular to one of the following substance classes: (oligo)-alkoxylates—in particular lower alkoxylates, wherein here particular importance is given to corresponding ethoxylates and/or propoxylates—of basic molecules of natural and/or synthetic origin which contain lipophilic radicals and are capable of alkoxylation. Alkoxylates of the type indicated are, as is known, non-ionic emulsifiers—i.e. with a terminal free hydroxyl group at the alkoxylate radical—, however the corresponding compounds may also be closed by end groups, for example by esterification and/or etherification. A further important class of non-ionic emulsifiers for the purposes of the invention are partial esters and/or partial ethers of polyfunctional alcohols with in particular 2 to 6 C atoms and 2 to 6 OH groups and/or their oligomers with acids containing lipophilic radicals, and/or alcohols. Compounds of this type are also particularly suitable here, when they additionally contain (oligo-)alkoxy radicals and here in particular corresponding oligoethoxy radicals bonded into their molecule structure. The polyfunctional alcohols with 2 to 6 OH groups in the basic molecule or the oligomers deriving therefrom can be, in particular diols and/or triols or their oligomerization products, wherein glycol and glycerol or their oligomers can be particularly important. Known non-ionic emulsifiers of the type of ethylene oxide/propylene oxide/butylene oxide block polymers are also to be assigned to the range of partial ethers of polyfunctional alcohols. A further example of corresponding emulsifier components are alkyl(poly)glycosides of long-chain alcohols and the already mentioned fatty alcohols of natural and/or synthetic origin or alkylol amides, amine oxides and lecithins. The co-use today of commercially available alkyl(poly)glycoside compounds (APG compounds) as emulsifier components in the sense according to the invention can be particularly interesting inter alia because the concern here is with an emulsifier class having particularly marked eco-compatibility. Without claiming completeness, from the substance classes of suitable emulsifier components listed here, in addition the following representatives must be named: (oligo) alkoxylates of fatty alcohols, fatty acids, fatty amines, fatty amides, fatty acid- and/or fatty alcohol esters and/or—ethers, alkanol amides, alkyl phenols and/or their reaction products with formaldehyde and further reaction products of carrier molecules containing lipophilic radicals with low alkoxides. As indicated, the respective reaction products can also be at least partially closed by end groups. Examples of partial esters and/or partial ethers of polyfunctional alcohols are, in particular, the corresponding partial esters with fatty acids, for example of the type of the glycerol mono- and/or diesters, glycol monoesters, corresponding partial esters of oligomerized polyfunctional alcohols, sorbitan partial esters and suchlike and also corresponding compounds with ether groupings. It can be advantageous in the sense of the present teaching to dispense with the use of di-fatty acid esters of polyglycerols, in particular of polyglycerol-2 or -3 distearate or di-fatty acid esters of di- and/or tri-glycerol with C10-C20 fatty acids in invert drilling muds according to the above description.

The oil phases of the compositions according to the invention preferably have pour points below 0° C., preferably below −5° C. (measured in accordance with DIN ISO 3016: 1982-10). The Brookfield viscosity of the oil phases at 0° C. is a maximum of 50 mPas. The borehole treatment compositions according to the invention, when they are formed as an oil-based drilling mud of the W/O type, have a plastic viscosity (PV) in the range of from 10 to 70 mPas and a yield point (YP) of from 5 to 60 lb/100 ft$^2$, respectively determined at 50° C. The kinematic viscosity of the oil phase, measured in accordance with Ubbelohde at 20° C. should preferably be a maximum of 12 mm$^2$/sec. The aqueous phase of the compositions according to the invention preferably has a pH value in the range of from 7.5 to 12, preferably from 7.5 to 11 and in particular from 8 to 10.

In addition to the listed constituents, the compositions according to the invention also contain additives, for example weighting agents, fluid-loss additives, further viscosity-regulating additives, wetting agents, salts, biocides, corrosion inhibitors, and/or an alkali reserve and, especially, emulsifiers. The general rules for the composition of the respective treatment fluids for which information is given by way of example in the following with reference to corresponding drilling slurries apply here. The additives can be water-soluble, oil-soluble and/or water- or oil-dispersible.

Conventional additives can be: fluid-loss additives, soluble and/or insoluble substances which build up structural viscosity, alkali reserves, agents for inhibiting the undesired water exchange between drilled formations—e.g. water-swellable clays and/or salt layers—and the e.g. water-based drilling fluid, wetting agents for better uptake of the emulsified oil phase on solid material surfaces, e.g. to improve the lubricating effect, but also to improve the oleophilic closure of exposed rock formations or rock surfaces, biocides, for example for inhibiting the bacterial attack on O/W emulsions and suchlike. The following are mentioned accordingly only by way of an extract: finely disperse additives to increase the mud density: Barium sulphate (barite) is widely used, but calcium carbonate (calcite) or the mixed carbonate of calcium and magnesium (dolomite) are also used.

Agents to build up the structural viscosity, which at the same time also act as fluid-loss additives: Primarily, bentonite or hydrophobized bentonite should be named here. For salt water muds, other comparable clays, in particular attapulgite and sepiolite, are of considerable importance in practice.

The co-use of organic polymer compounds of natural and/or synthetic origin can also be given considerable importance in this connection. Here, in particular, starch or chemically modified starches, cellulose derivatives such as carboxymethyl cellulose, guar gum, synthane gum or also purely synthetic water-soluble and/or water-dispersible polymer compounds, in particular of the type of high molecular polyacrylamide compounds with or without anionic or cationic modification should be mentioned. Thinners for viscosity regulation: The so-called thinners can be organic or inorganic in nature. Examples of organic thinners are tannins and/or quebracho extract. Further examples for this are lignite and lignite derivatives, in particular lignosulphonates.

EXAMPLES

Production of the Oligoglycerol Esters 924 g (77% by weight) of a technical-grade oleic acid (acid number 201.2) were mixed with 276 g (23% by weight) of oligoglycerol (OH number:1178) (weight ratio 3.3:1) in a tank and then heated under a nitrogen atmosphere to 240° C. The released reaction water was removed distillatively. When the acid number of the reaction mixture was less than 5, the pressure was reduced to 22 mbar. Thereafter, the mixture was cooled to 90° C. Then 1 g (1% by weight) of bleaching earth (Tonsil®) was added and the mixture was then stirred for approx. 0.5 h. 1080 g of a red-brown, clear liquid was obtained.

A total of 5 different oligoglycerol esters were produced in an analogous manner:

| Additive No. | Fatty acid | Mol ratio fatty acid:oligoglycerol |
|---|---|---|
| (1) | Oleic acid | 4:1 |
| (2) | Oleic acid | 3:1 |
| (3) | Oleic acid | 2:1 |
| (4) | Oleic acid | 1.5:1 |
| (5) | Tall oil fatty acid | 4:1 |

Application Tests

Three basic muds (I, II and III) were produced from the following ingredients:

| Mud I (Mud weight 14 lb/gal, oil-water ratio 80:20 vv): | |
|---|---|
| 262.5 ml | Paraffin oil |
| 4.2 g | Emulsifier |
| 2.0 g | Ca(OH)$_2$ |
| 87.5 ml | CaCl$_2$ - solution (25% by weight in water) |
| 3.5 g | Fluid-loss additive |
| 3.5 g | Structure forming agent |
| 280 g | Barium sulphate |

| Mud II (Mud weight 14 lb/gal, oil-water ratio 70:30 vv): | |
|---|---|
| 174 ml | Paraffin |
| 78 ml | Water |
| 1 g | Structure forming agent |
| 6 g | Emulsifier |
| 1.5 g | Ca(OH)$_2$ |
| 5 g | Fluid loss Additive |
| 27 g | CaCl$_2$ |
| 314 g | Barium sulphate |

| Mud III (Mud weight 12 lb/gal, oil-water ratio 70:30 vv): | |
|---|---|
| 182 ml | Paraffin |
| 47 ml | Water |
| 10 g | Emulsifier |
| 5 g | Ca(OH)$_2$ |
| 45 ml | CaCl$_2$ solution (23%) |
| 8 g | Structure forming agent |
| 221 g | Barium sulphate |

As additive, 17.5 g of an oligoglycerol ester (1) were added as well in each case. For comparison, a mud without additive was measured. The muds were tested by the Almen-Wieland test for their lubricating effect. The following conversion factors apply for conversion to the SI system: 1 lbf=4.448 m kg s; 1 lb=0.454 kg; 1 gal=3.79 l.

Figure 1:
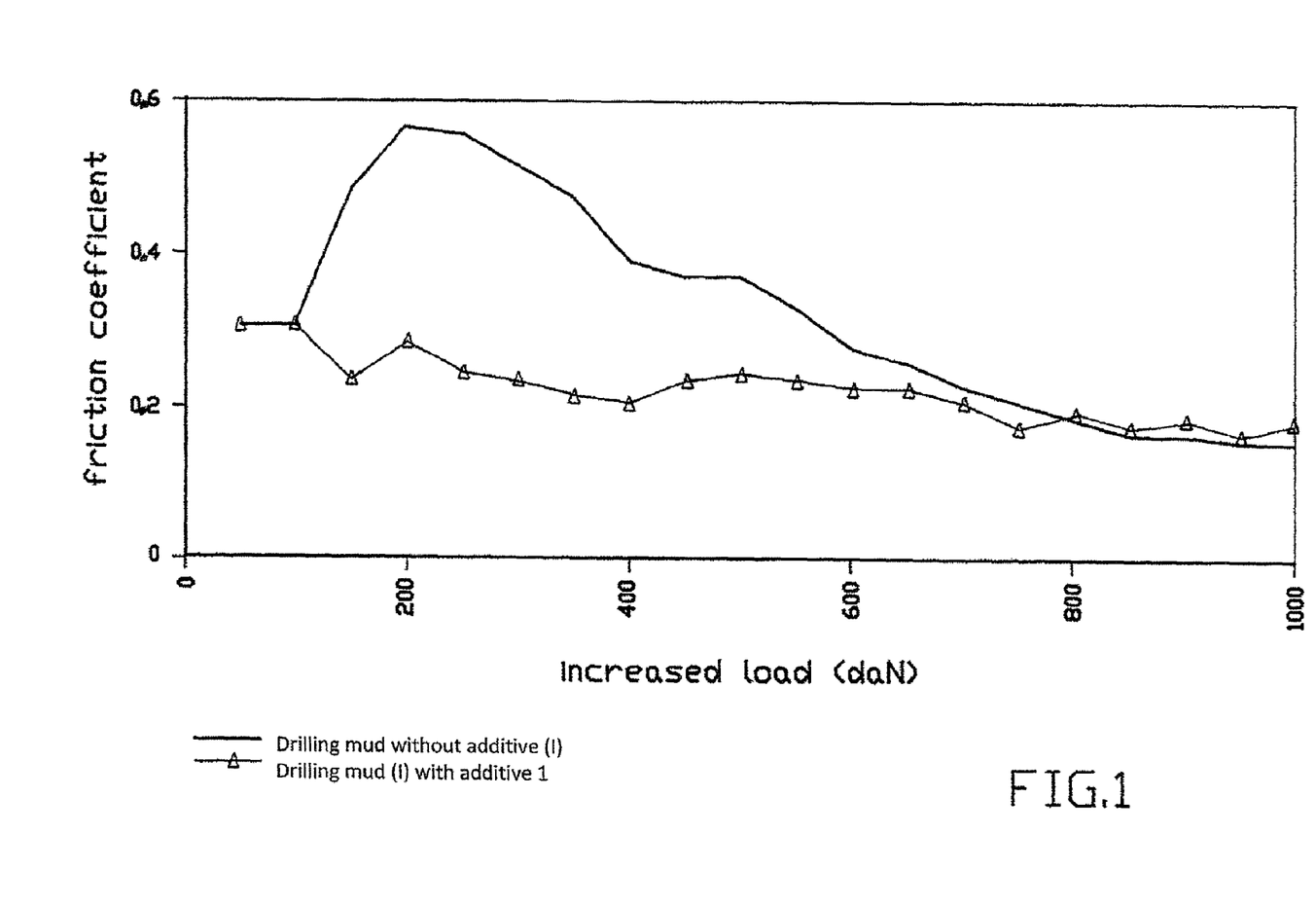
FIG 1 is a graph showing a comparison of friction coefficient and increased load.

FIG. 1 shows the graph of the measurement of the mud (I), firstly with the added additive (1), secondly without the additive. It can be seen that the mud with the added additive has a lower friction value than the mud without the additive, under the same loading.

Figure 2:
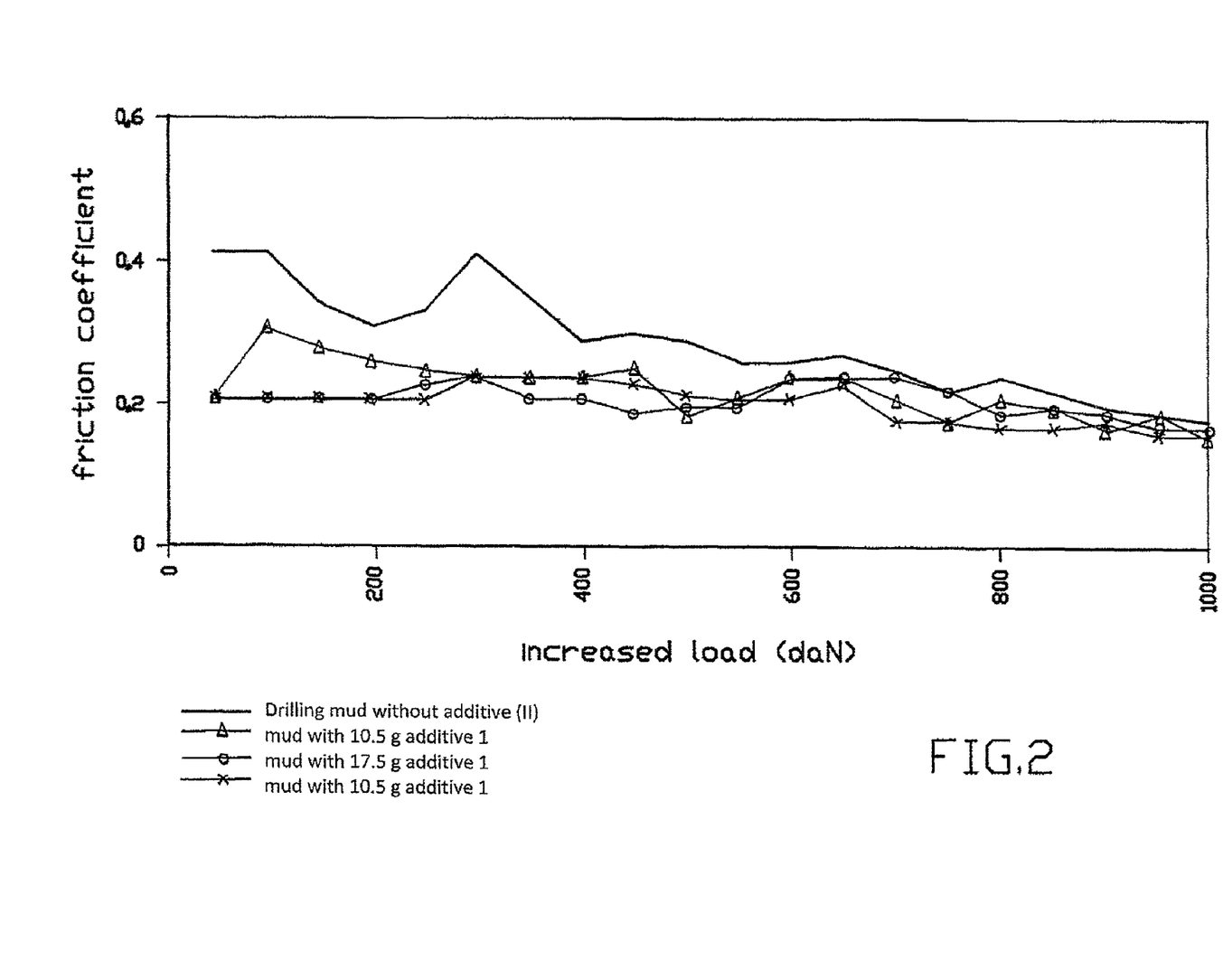
FIG 2 is a graph showing a comparison of friction coefficient and increased load; and <div style="text-align:center">
Signed and Sealed this<br>
Twenty-fifth Day of September, 2012
</div>

FIG. 2 relates to mud (II), wherein the additive (1), however, has been added in quantities of 10.5 g, 17.5 g and 30.0 g, compared with a mud without any added additive. Here, also, the influence of the oligoglycerides according to the invention can be seen, improving the lubrication of the mud.

Figure 3:
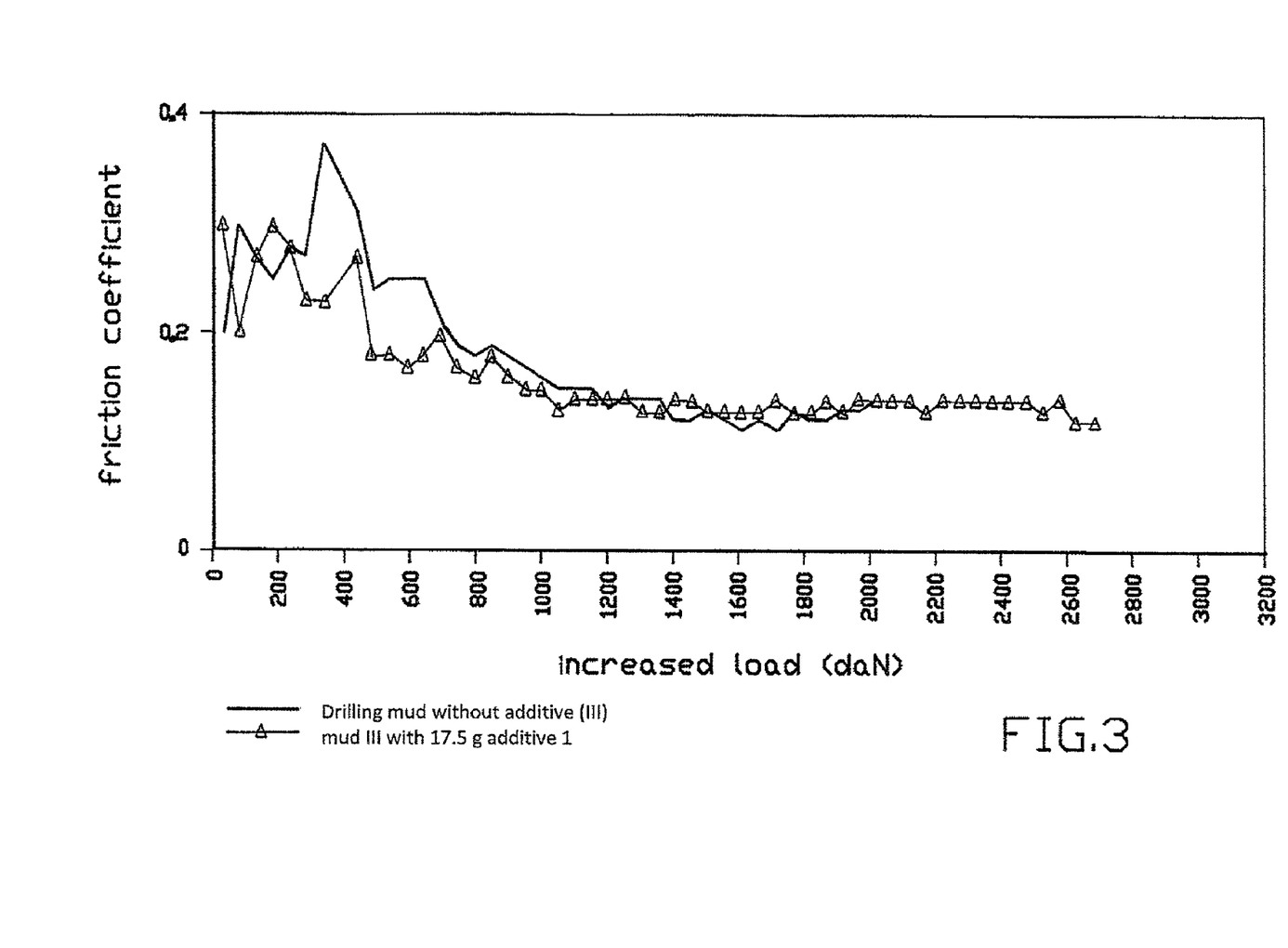
FIG 3 is a graph showing a comparison of friction coefficient and increased load.

FIG. 3 relates to mud (III), which again has been measured with the added additive (1) and without an additive. It can be seen that the system with the oligoglycerol ester (1) withstands much more pressure than the mud without the added additive.

LEGENDS TO THE DRAWINGS

FIG. 1
Mud (I) with no added additive
Mud (I) with additive 1
FIG. 2
Mud II with no added additive
Mud with 10.5 g of additive 1
Mud with 17.5 g of additive 1
Mud with 30.0 g of additive 1
FIG. 3
Mud III with no added additive
Mud III with 17.5 g of additive 1

The invention claimed is:

1. A lubricant additive in oil-based drilling mud composition comprising an oligoglycerol fatty acid esters, produced from
   (a) an acid component, selected from
      (a1) fatty acids of the general formula (I)

$$R\text{---}COOH \qquad (I)$$

in which R stands for a saturated or unsaturated, branched or linear alkyl- or alkenyl radical with 7 to 21 C atoms, and/or
      (a2) dicarboxylic acids and/or
      (a3) dimer fatty acids and/or
      (a4) oligomer fatty acids and/or
      (a5) hydroxy fatty acids; and
   (b) a polyol component, which is selected from oligoglycerols or alkoxylates of oligoglycerols;
   wherein said oil-based drilling mud comprises paraffin; and
   wherein said paraffin comprises 13 to 22 carbon atoms and other hydrocarbons including alpha olefin, internal olefins.

2. The lubricant additive in oil-based drilling mud composition according to claim 1, characterized in that the fatty acids of formula (I) are selected from unsaturated, linear fatty acids.

3. The lubricant additive in oil-based drilling mud composition according to claim 1, characterized in that oligoglycerol fatty acids esters are selected, which were produced by conversion of oligoglycerols of formula (II)

(II)

in which n denotes a number between 2 and 10, with fatty acid mixtures;
   wherein said fatty acid mixtures comprise mixtures of saturated and unsaturated fatty acids and/or dicarboxylic acid and/or dimeric and/or oligomeric fatty acids.

4. The lubricant additive in oil-based drilling mud composition according to claim 1, characterized in that tri-, tetra- and/or pentaesters of the oligoglycerols are used.

5. The lubricant additive in oil-based drilling mud composition according to claim 1, characterized in that oleic acid or tall oil fatty acids or mixtures thereof are used as fatty acid for the esterification.

6. The lubricant additive in oil-based drilling mud composition according to claim 1 characterized in that in the esterification, the molar ratio of fatty acids:oligoglycerol lies in the range of from about 5:1 to about 1:1.

7. The lubricant additive in oil-based drilling mud composition according to claim 1 characterized in that in the esterification, the molar ratio of dimer fatty acids or oligomeric fatty acids to oligoglycerol lies in the range of from about 1:1 to about 1:2.

8. The lubricant additive in oil-based drilling mud composition according to claim 1, characterized in that the oligoglycerol esters are used as additive in a mixture with surfactants, hydrocarbons, fatty alcohols, fatty acid esters and/or fatty acids or glycerol, triglyceride or glycols.

9. A method for improving the lubricating effect of oil-base drilling muds wherein oligoglycerides according to the description in claim 1 are added to the muds in quantities of about 0.1 to about 10% by weight.

10. A lubricant additive in oil-based drilling mud composition comprising an oligoglycerol esters, produced from
(a) an acid component, selected from
(a1) fatty acids of the general formula (I)

R—COOH     (I)

in which R stands for a saturated or unsaturated, branched or linear alkyl- or alkenyl radical with 7 to 21 C atoms, and (b) a polyol component selected from oligoglycerol or alkoxylates of oligo glycerol.

11. The lubricant additive in oil-based drilling mud composition according to claim 10 characterized in that in the esterification, the molar ratio of elements a:b lies in the range of from about 5:1 to about 1:1.

12. The lubricant additive in oil-based drilling mud composition according to claim 10 wherein the acid component is from oleic acid or tall oil fatty acid.

13. The lubricant additive in oil-based drilling mud composition according to claim 10 wherein the acid component is oleic acid.

14. The lubricant additive in oil-based drilling mud composition according to claim 10 wherein the polyol component is selected from oligoglycerol.

15. The lubricant additive in oil-based drilling mud composition according to claim 10 wherein the acid component is tall oil fatty acid.

* * * * *

UNITED STATES PATENT AND TRADEMARK OFFICE
CERTIFICATE OF CORRECTION

| | | |
|---|---|---|
| PATENT NO. | : 8,236,735 B2 | Page 1 of 2 |
| APPLICATION NO. | : 12/677845 | |
| DATED | : August 7, 2012 | |
| INVENTOR(S) | : Diana Maker and Heinz Muller | |

It is certified that error appears in the above-identified patent and that said Letters Patent is hereby corrected as shown below:

<u>Column 1</u>,
Please insert the following paragraph and heading immediately after the title and before Line 5:

--This application is a national stage application under 35 U.S.C. 371 of international application No. PCT/EP2008/062199 filed 12 September 2008, and claims priority to European Application No. EP 07 018 087.2 filed 14 September 2007, the disclosures of which are expressly incorporated herein by reference.

BACKGROUND--.

Please insert the following heading and paragraph immediately after Line 56:

--SUMMARY

The present invention includes various embodiments as set forth herein.--.

<u>Column 2</u>,
Please insert the following heading, paragraphs, and heading immediately before Line 4:

--FIGURES

The foregoing and other features, aspects, and advantages of the present invention will become better understood with regard to the following description, appended claims, and accompanying drawings where:

<div style="text-align:center">
David J. Kappos<br>
<i>Director of the United States Patent and Trademark Office</i>
</div>

DETAILED DESCRIPTION--.

<u>Column 14,</u>
Line 5, "of oligo glycerol." should read --of oligoglycerol.--.